(12) United States Patent
Penide

(10) Patent No.: US 8,352,377 B2
(45) Date of Patent: Jan. 8, 2013

(54) SYSTEM AND METHOD FOR ELECTRONIC PAYMENT

(75) Inventor: Philippe Penide, Luxembourg (LU)

(73) Assignee: Absolu Telecom S.A., Luxembourg (LU)

( * ) Notice: Subject to any disclaimer, the term of this patent is extended or adjusted under 35 U.S.C. 154(b) by 251 days.

(21) Appl. No.: 12/879,098

(22) Filed: Sep. 10, 2010

(65) Prior Publication Data

US 2012/0066096 A1 Mar. 15, 2012

(51) Int. Cl.
*G06Q 20/00* (2012.01)
*G06Q 30/00* (2012.01)
(52) U.S. Cl. .......................................... 705/64; 705/26.1
(58) Field of Classification Search .................. 705/64
See application file for complete search history.

(56) References Cited

U.S. PATENT DOCUMENTS

| | | | | |
|---|---|---|---|---|
| 2007/0100710 A1* | 5/2007 | Singh | ............................... | 705/26 |
| 2008/0109334 A1* | 5/2008 | Lewis et al. | ...................... | 705/35 |
| 2008/0222030 A1* | 9/2008 | Fischler | .......................... | 705/39 |
| 2008/0254765 A1* | 10/2008 | Eliaz | .............................. | 455/406 |
| 2010/0049654 A1* | 2/2010 | Pilo | ................................. | 705/43 |

* cited by examiner

*Primary Examiner* — Calvin L Hewitt, II
*Assistant Examiner* — Zeshan Qayyum
(74) *Attorney, Agent, or Firm* — Schmeiser, Olsen & Watts, LLP

(57) ABSTRACT

An electronic payment method and system between a seller and a buyer to purchase a good providing a dynamic allocation to the seller of predefined SMS numbers and predefined SMS messages is provided. Furthermore, an associated system to carry out an electronic payment over a public network between a seller and a buyer is also provided.

40 Claims, 4 Drawing Sheets

SYSTEM AND METHOD FOR ELECTRONIC PAYMENT

FIELD OF TECHNOLOGY

The following relates to a method and a system for carrying out electronic payment, in particular, embodiments of micropayment over internet.

BACKGROUND

An electronic payment is a financial transaction in which an amount of money is exchanged electronically between a vendor and a buyer. Typically, this involves systems and processes of debits and credits using computer networks, public network such as internet and digital stored value systems.

A micropayment is an electronic payment of a very small amount of money, from few cents to few dollars, and generally less than 10 US dollars, which is used to purchase different kinds of goods on the internet. Generally, the goods are immaterial goods such as information like web pages, newspaper or magazine articles, stock quotes, comic strips, clip art and music tracks, software and computer games, or access means to access to some shared resources, like databases, applications or common services.

For electronic payment and more particularly for micropayment, the conventional payment means, i.e. credit card payment, is not suitable as the final cost of the goods is prohibitive due to the cost of card transaction processing, leading thus the good less attractive to buyers.

Pre-registration at an online payment solution is also a solution for electronic payment or micropayment; however, this solution is not user friendly due to the registration process which may be long and complicated.

It has also been suggested to use a premium rate or special rate phone number, which the buyer has to dial to get an access code, given by artificial or pre-recorded voice messages recorded onto an Interactive Vocal Server. The buyer must then have to enter this code into a web form provided by the seller on his website to gain access to the good. For a given vendor, the phone number is always the same for all consultation and all purchases, the code being different for each purchase, and randomly generated to match the identification system.

An alternative to the special rate phone number is the use of premium SMS (Short Message Service). The consumer sends a payment request via an SMS text message to a short code, a special telephone number, or to an international number format telephone number. The merchant involved is informed of the payment and can then allow the access to the good, or a SMS message comprising an access code is sent to the buyer, which he has then to enter into a web form to gain access once to the good.

In premium rate telephone numbers or premium SMS, the telephone or mobile phone bill of the buyer may be then charged for the purchase of the amount corresponding to the purchase.

These solutions present the drawback, among others, of having a poor transformation rate which is, for a given vendor, the percentage of users making purchases out of the total number of visitors of the web site during a reference period. The transformation rate is a good indicator of the capacity of the web site to transform visitors into buyers.

Furthermore, these solutions, as all the solutions providing access codes, also called tickets, present the drawback of being prone to errors, comprehensive errors during communication of the code, or typing errors when the buyer enters the code into a web form. The buyer is then debited for his purchase as the access code was given to him but he cannot gain access to the goods he wanted, leading to the discontentment of the buyer. Thus, a need exists for a system and method for electronic payment between a seller and a buyer to purchase a good providing a dynamic allocation to the seller of predefined SMS numbers and predefined SMS messages.

SUMMARY

A first general aspect relates generally to a method and a system for carrying out an electronic payment.

A second general aspect relates generally to a method and a system to carry out an electronic payment which is an alternative to traditional payment method involving an access code.

A third general aspect relates generally to a method and a system to carry out an electronic payment with simplified procedures for validating a micropayment.

A fourth general aspect relates generally to a method and a system to carry out an electronic payment which optimizes the transformation rate.

A fifth general aspect relates generally to a method and a system to carry out an electronic payment secure and user friendly, providing enhanced satisfaction of buyers.

A sixth general aspect relates generally to a method and a system to carry out a micropayment over internet.

A seventh general aspect relates generally to a method, a system, and a computer program, to carry out an electronic payment between a seller and a buyer, to purchase a good wherein a dynamic allocation of a predefined SMS number and a predefined SMS message is provided.

An eighth general aspect relates generally to the dynamic allocation for a determined and limited time period, of a predefined SMS number and a predefined SMS message to a given transaction between a single seller and a single buyer, the disabling of the allocated SMS number and a SMS message for a new allocation and the reallocation for a new transaction of said SMS number and SMS message after the determined and limited time period has expired.

A ninth general aspect relates generally to a method and a system wherein the association between the allocated SMS number and a SMS message to a seller, and the use of said SMS number and a SMS message by a buyer, allows to associate a single seller to a single buyer.

A tenth general aspect relates generally to a predefined SMS number and/or predefined SMS message being user-friendly.

An eleventh general aspect relates generally to user-friendly SMS messages defined or generated according to the length of the message, according to the fact that said message is present in a dictionary, according to the alternation of consonant and vowel, according to the physical distance on a communication device allowing to send SMS messages, according to the redundancy of the characters in said SMS message, according to the fact that the characters forming said message may form a forbidden message.

A twelfth general aspect relates generally to method and a system for determining the geographic localisation of the buyer and the allocation of the SMS number and SMS message takes into account this geographic localisation. The way of defining or generating user-friendly SMS message may also take into account this geographic localisation.

BRIEF DESCRIPTION OF THE DRAWINGS

Some of the embodiments will be described in detail, with reference to the following figures, wherein like designations denote like members, wherein.

DETAILED DESCRIPTION

Real-life commerce and electronic commerce (e-commerce) require at least two actors, a buyer and a seller, the buyer is often called customer, and the seller merchant. The method and the system to carry out an electronic payment may require a third party being called intermediate or manager.

The intermediate may offer a solution, a method and a system, to carry out an electronic payment for real-life commerce or e-commerce, which is also suitable for micropayment.

Figure 1:
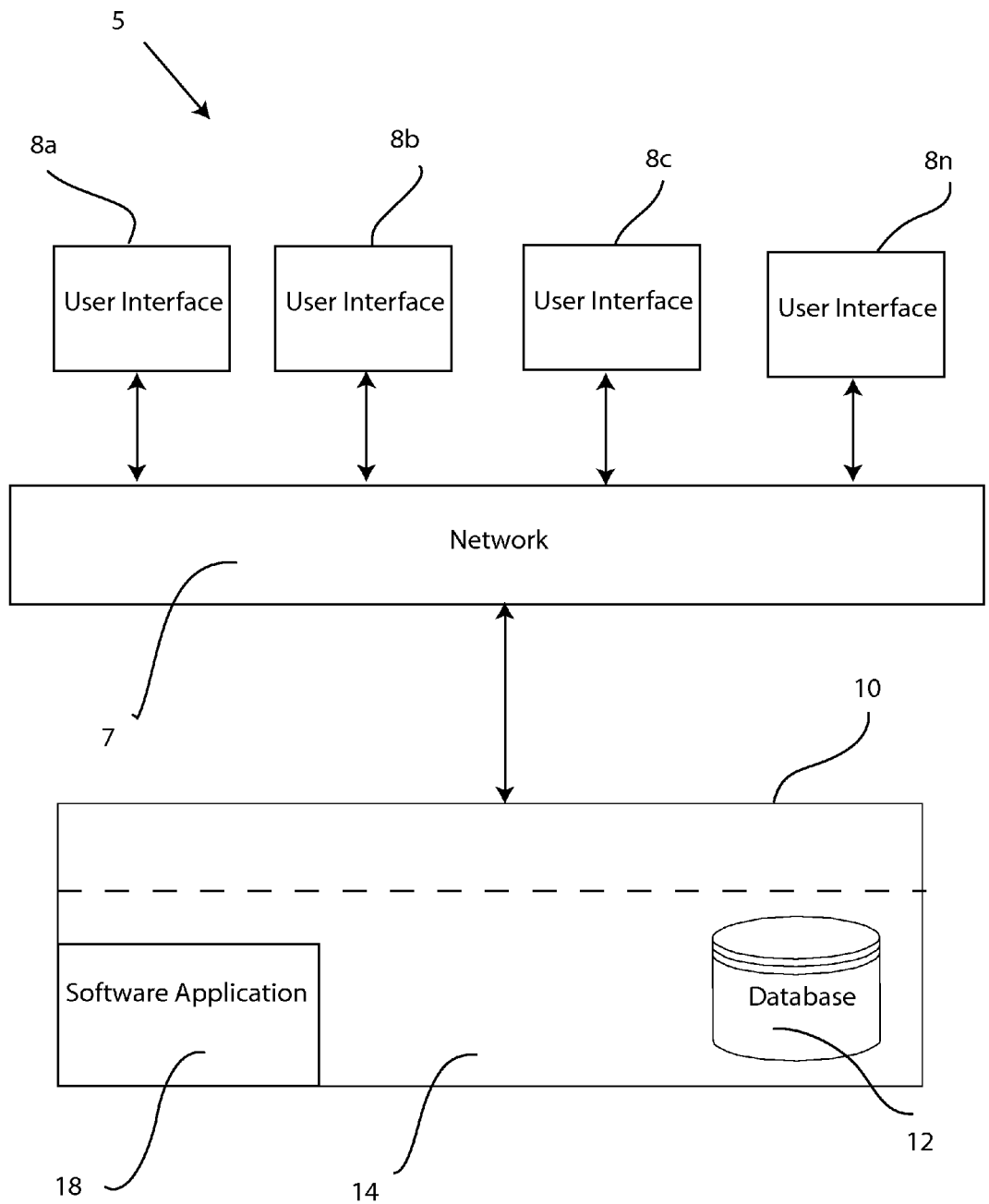
FIG. 1 depicts an embodiment of a system that is used with a computer-implemented electronic payment method.

Referring to FIG. 1, an embodiment of system 5 may be used to implement a method of electronic payment 100. System 5 may implement the steps of receiving a request from a seller, allocating to the seller, for a determined and limited time period, a predefined short message service (SMS) number and a predefined SMS message, disabling during the limited time period the allocation of the SMS number and the SMS message already allocated to the seller, communicating to a buyer the predefined SMS number and the predefined SMS message, receiving a SMS message from the buyer through a telecommunication network, associating the buyer with the seller by associating the SMS message received from the buyer with the predefined SMS number allocated to the seller, enabling the buyer to access to the good, and freeing the predefined SMS number and the predefined SMS message for a new allocation to a new transaction.

System 5 may comprise user interfaces 8a . . . 8n connected through a network 7 to a computing system 10. Network 7 may comprise any type of network including, inter alia, a telephone network, public network, a cellular telephone network, a local area network, (LAN), a wide area network (WAN), the Internet, etc. User interfaces 8a . . . 8n may comprise any type of devices capable of implementing a social network including, inter alia, a telephone, a cellular telephone, a digital assistant (PDA), a smart phone, a video game system, an audio/video player, a personal computer, a laptop computer, a computer terminal, etc. Each of user interfaces 8a . . . 8n may comprise a single device or a plurality of devices. User interfaces 8a . . . 8n are used by end users for communicating with each other and computing system 10. For example, users may use the user interfaces 8a . . . 8n to send and receive a plurality of SMS messages over a network 7 of system 5. Computing system 10 may comprise any type of computing system(s) including, inter alia, a personal computer (PC), a server computer, a database computer, etc. Computing system 10 may be used to measure and monitor information exchanged between devices 8a . . . 8n. Computing system 10 may comprise a memory system 14. Memory system 14 may comprise a single memory system. Alternatively, memory system 14 may comprise a plurality of memory systems. Memory system 14 may also comprise a software application 18 and a database 12. Database 12 may include all retrieved and calculated data associated with measuring and monitoring the steps associated with the program 100. For instance, software application 18 can enable a computer-implemented electronic payment method 100.

Figure 2:
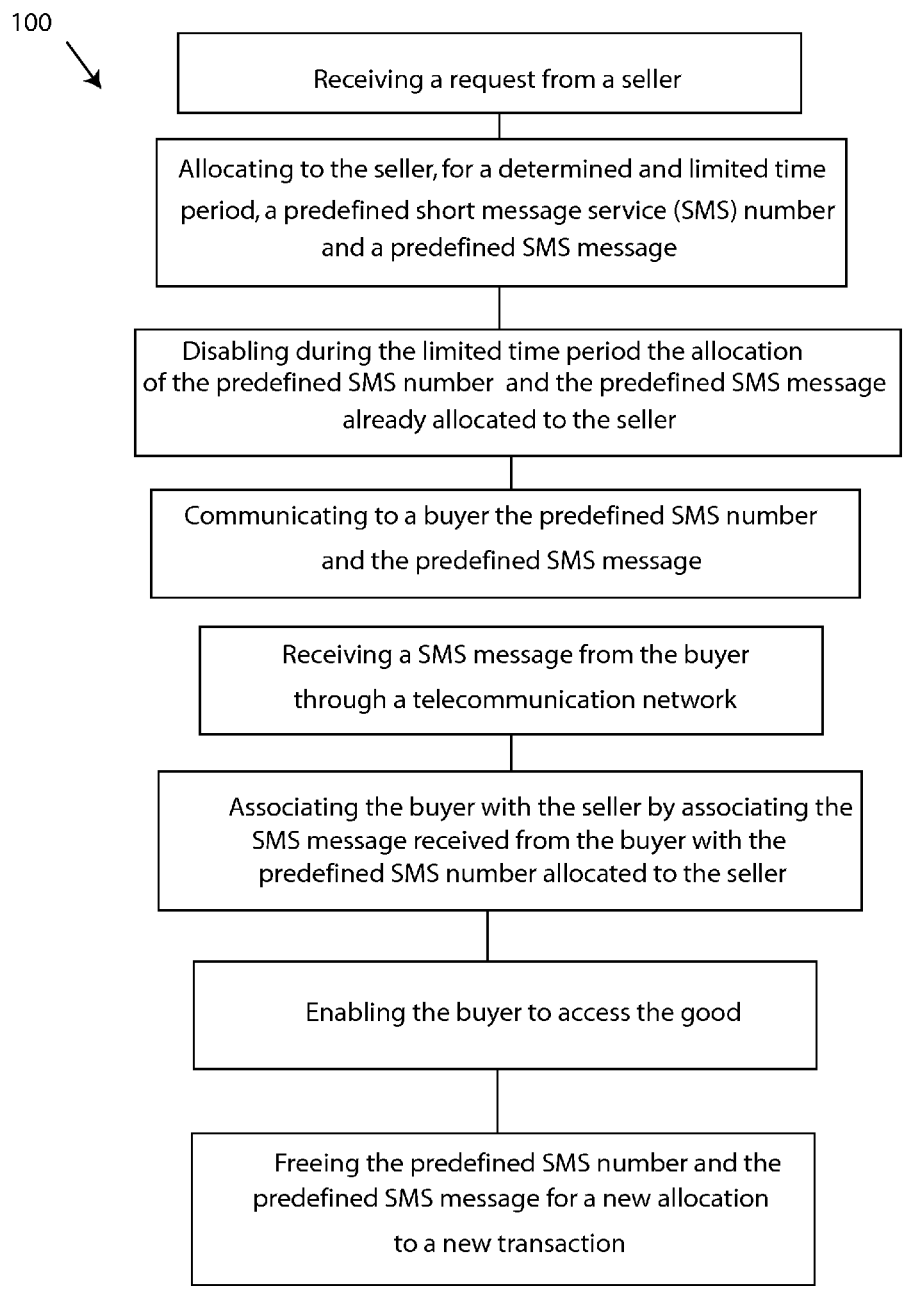
FIG. 2 depicts a flowchart of an electronic payment method.
Figure 3:
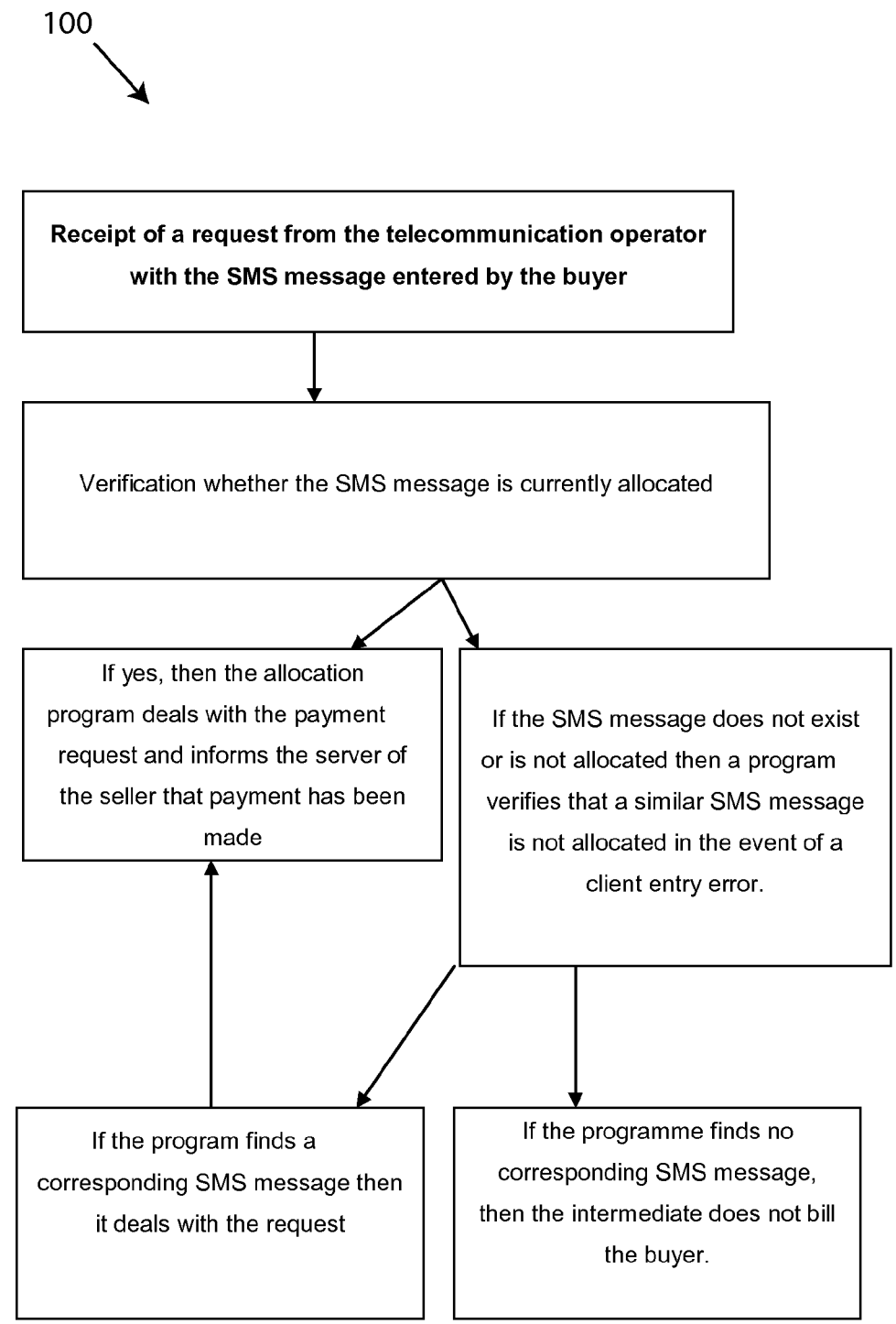
FIG. 3 depicts a flowchart representing the process following the receipt of a SMS message to the SMS number.

Referring now to FIGS. 2 and 3, the method may comprise the step of allocating to the seller, for a determined and limited time period, a predefined SMS number and/or SMS message associated to the SMS number.

The dynamic SMS number and/or SMS message allocation, offered by the intermediate, may allow to link a specific buyer to a specific seller.

The SMS number and SMS message associated to said SMS number are generated, or selected, among predefined SMS numbers and/or messages. After having checked that a SMS number and a SMS message is not already allocated for the current transaction between the buyer and the seller, a SMS number and a SMS message is allocated.

The SMS number and SMS message are allocated to a single seller for a transaction with a single buyer. No new allocation of this already allocated SMS number and/or message could then be made to the same buyer or to another buyer for another transaction.

In order to avoid malicious multiple requests of allocation, the method may further comprise a step of limiting the number of allocations possible for a unique buyer.

To gain access or to purchase the good, the buyer has then to send the predefined SMS message to the allocated SMS number.

A telecommunication operator delivers the SMS message from the buyer to an intermediate server by any suitable means, said intermediate server associating the SMS number and/or SMS message allocated to whom (the seller) the SMS number and/or SMS message was allocated.

The seller is then informed, by any suitable means, that the predefined SMS message to the SMS number was sent by the buyer. The seller allows then the access to the good or accepts the purchase.

The buyer receives, by any suitable means, preferably by a SMS message delivered by a telecommunication operator, a confirmation that his SMS was received and that the access to the good is granted.

After the transaction has been recorded and the buyer has accessed the good, or after a determined and limited time period if the access to the good was not enabled, the SMS number and/or message is freed up for a new allocation for another transaction.

The SMS number and SMS message are allocated for any suitable limited time period, preferably from one minute to several minutes, more preferably not more than 20 minutes as generally 20 minutes is considered enough to allow the buyer to take his telephone or mobile phone, to enter the SMS number and SMS message and to access to the good. After this time period the SMS number and/or message are freed for a new allocation.

The SMS message being a premium SMS number, the billing of the access, or purchase, is preferably made by the operator on the telephone or mobile bill of the buyer. According to financial agreements, the operator transfers to the intermediate or manager providing the system and implementing the method, all or a part of the amount billed, and said intermediate pays the seller a fixed amount or a variable amount depending on the value of the good purchased.

At least one SMS number is reserved by at least one telecommunication operator providing telecommunication means to the intermediate for providing the system and implementing the method. Preferably the telecommunication operator attributes several SMS numbers to said intermediate.

The at least one SMS number is any suitable telephone number that can be used to address SMS or MMS messages from mobile or fixed phones. The at least one SMS number have any suitable format and/or length depending of the localisation, the country or region wherein the method and the system is offered and used. The at least one SMS number may be a short code number, or a local format number, or an international format number comprising the country code, the network prefix and the phone number itself. The at least one SMS number may fulfill the requirements of the E.164 norm in the telecommunication field. As an example, one suitable SMS number for the United States of America can be "5 50 50" or for example for France a suitable number can be "81 114".

Preferably, the at least one SMS number is provided, and has the suitable format, in accordance to the localisation of the buyer or of the seller, or both.

Due to the dynamic allocation, allocation and reallocation, the method presents the advantage of not needing a large amount of SMS numbers to allocate. According to the number of sellers and/or purchases by sellers, the method and system may use one or several SMS numbers.

In a preferred embodiment, one SMS number is used with several and different predetermined SMS messages.

In the embodiment comprising several SMS number, said number may be randomly selected within a predetermined list among SMS numbers attributed to the intermediate by the telecommunication operator. However, the SMS numbers may also be selected according to specific criteria to allocate in priority SMS numbers. The specific criteria may be all suitable criteria so that the SMS number is user friendly, for example, being easy to dial or easy to remember.

SMS (Short Message Service) allows transmitting messages having a length of 160 characters in the GSM standard.

The SMS message associated to the SMS number or numbers may comprise at least one alphanumeric character, preferably several alphanumeric characters. The SMS message may comprise a sequence of numbers or letters or both.

The SMS message is not generated randomly, but is rather pre-defined to allow making the payment easier. The definition of the SMS message is made using any suitable method to define a message as being user friendly or to rank the message from the most user friendly message to the worse user friendly message. The method includes any suitable rule or combination of rules. Preferably, the method includes giving a mark to the SMS message and to allocate only to the seller the SMS message having the best mark.

To give a mark to the SMS message, any suitable rule or rules could be applied, which may be different according to the country and languages used by the seller and/or the buyer, more preferably according to the nationality or language of the buyer.

In one embodiment, each SMS message generated is given a mark starting from zero and increasing as the message may comprise elements being not user friendly. Therefore, a high mark is given to a message not considered as user friendly and a low mark means that the message is actually user friendly.

The SMS message has a length comprised between 1 to 160 characters, preferably between 1 to 8, more preferably no more then 8, and even more preferably no more than 6 characters.

The embodiments in which the SMS message comprises no more than 8 characters being 8 letters have the advantage of allowing the use of the characters given first of a common telephone or mobile keypad alphabet layout, i.e. "a", "d", "g", "j", "m", "p", "t", "w", which avoids multiple pressure on the keypad and avoid thus possible errors.

For a SMS message comprising letters, the rules, to define or to rank a message as being user friendly, may be the following.

A rule may refer to the length of the message corresponding to the number of character present in the message. The aim of this rule is to give a high mark to long word and therefore to favour short messages. As an example, the rule may be the following: If the length is 1, the mark given is 1. If the length is 2, the mark given is 2. If the length is 3, the mark has to be higher than 3, for example 9. If the length is 4, the mark has to be significantly higher than the one given for a length of 3 characters, for example 20. If the length is 5 the mark has to be significantly higher than the one given for a length of 4 characters, for example 25. For length higher than 5 characters, the mark has to be significantly higher than the one given for a length of 4 characters, and may, for example, be a mark defined by the following formula: $60+[100\times(\text{length}-5)]$, said formula favouring short messages without limiting too much the size of the message, i.e. message of more than 5 characters are thus penalized.

Another rule may be used to determine if the message is a word, an abbreviation or an acronym, present in at least a conventional and multi-field dictionary. Technical dictionaries or single-field specialised dictionaries may also be used, alone or in combination. As an example, a conventional dictionary may be Harrap's for the English language and Larousse for the French language.

The abbreviation or acronym, to which the message may correspond, is any conventional or technical abbreviation present in a dictionary or used in text messaging.

If the message text is not present in a dictionary, a mark of 100 is given. This rule may be adjusted by one having skill in the art according to the country and languages used by the seller and/or the buyer, more preferably according to the nationality or language of the buyer.

In the embodiment wherein the SMS message may comprise numbers, or numbers and letters, a low mark may be given for numbers referring to the phonetic equivalent of a word, e.g. "4" which corresponds phonetically to the word "FOR", or to an acronym, e.g. "g2g" for "got to go".

Another rule may refer to the alternation of consonant and vowel. If the message does not comprise a consonant followed by a vowel, or a vowel followed by a consonant, a mark of 100 is given.

Another rule may refer to the physical distance, the number of keys between two keys to press on a device allowing to send SMS, a telephone keypad for example, to enter two adjacent characters in the message. The mark given corresponds to twice the overall distance for each character in the message. For example, for a message being "AJTA", the mark given is 4 as the distance on a conventional telephone keypad between "A" and "J" is 1, between "J" and "T" is 1 and between "T" and "A" is 2.

Another rule may refer to redundancy of the characters used. The number of different characters used for the SMS message is analysed. The mark given is the number of unique character multiplied by 10.

Another rule may refer to combination of characters forbidden. If the SMS message corresponds to a chain of letters identified as forbidden, the SMS message is not used and not allocated. This rule aims to ban swear words or insulting words or the like. This banning rule, and in particular the list of forbidden sequences of characters is to be adjusted by the man skilled in the art according to the country and languages used by the seller and/or the buyer, more preferably according to the nationality or language of the buyer.

Preferably, the SMS message is defined in the method and system according to a combination of the rules disclosed here above. Therefore, the final mark of the SMS message is an addition of each individual mark given according to each rule.

The allocation of the SMS message takes into account the overall mark given.

Examples of how a SMS message comprising one to six characters, being six letters, may be defined or ranked for English language, are given in tables 1 to 6.

TABLE 1 one character SMS message.

| | SMS message | |
|---|---|---|
| Mark given | "a" | "d" |
| length | 1 | 1 |
| Dictionary | 0 | 0 |
| Consonant, vowel alternation | 0 | 0 |
| physical distance | 0 | 0 |
| redundancy | 10 | 10 |
| Final mark | 11 | 11 |

TABLE 2

Two characters SMS message.

| | SMS message | | | |
|---|---|---|---|---|
| Mark given | "ad" | "md" | "mg" | "mj" |
| Length | 2 | 2 | 2 | 2 |
| Dictionary | 0 | 0 | 0 | 100 |
| Consonant, vowel alternation | 0 | 10 | 10 | 10 |
| physical distance | 2 | 2 | 4 | 2 |
| redundancy | 20 | 20 | 20 | |
| Final mark | 24 | 34 | 36 | 134 |

TABLE 3

Three characters SMS message.

| | SMS message | | |
|---|---|---|---|
| Mark given | "dma" | "gda" | "gdd" |
| length | 9 | 9 | 9 |
| Dictionary | 100 | 100 | 100 |
| Consonant, vowel alternation | 10 | 10 | 10 |
| physical distance | 6 | 8 | 6 |
| redundancy | 30 | 30 | 20 |
| Final mark | 155 | 157 | 145 |

TABLE 4

Four characters SMS message.

| | SMS message | | |
|---|---|---|---|
| Mark given | "dpwp" | "dpwt" | "dpww" |
| length | 20 | 20 | 20 |
| Dictionary | 100 | 100 | 100 |
| Consonant, vowel alternation | 10 | 10 | 10 |

TABLE 4-continued

Four characters SMS message.

| | SMS message | | |
|---|---|---|---|
| Mark given | "dpwp" | "dpwt" | "dpww" |
| physical distance | 16 | 14 | 12 |
| redundancy | 30 | 40 | 30 |
| Final mark | 176 | 184 | 172 |

TABLE 5

Five characters SMS message.

| | SMS message | | |
|---|---|---|---|
| Mark given | "jmttt" | "jmttw" | "jmtwa" |
| length | 25 | 25 | 25 |
| Dictionary | 100 | 100 | 100 |
| Consonant, vowel alternation | 10 | 10 | 10 |
| physical distance | 6 | 8 | 14 |
| redundancy | 30 | 40 | 30 |
| Final mark | 171 | 183 | 199 |

TABLE 6

Six characters SMS message.

| | SMS message | | |
|---|---|---|---|
| Mark given | "adgjpt" | "adgjpw" | "adgjta" |
| length | 160 | 160 | 160 |
| Dictionary | 100 | 100 | 100 |
| Consonant, vowel alternation | 10 | 10 | 10 |
| physical distance | 16 | 18 | 18 |
| redundancy | 60 | 60 | 60 |
| Final mark | 346 | 348 | 336 |

The method to carry out an electronic payment may further comprise a step of determining the geographic localisation of the buyer, or of the seller, or of both, and to allocate, according to said geographic location, a telephone number, and attribute a SMS message, and thus applying rules to generate or to rank said message, taking into account the country and the language or languages of the buyer, or of the seller, or of both. In particular, the rule to determine whether the SMS message is a word present in at least one dictionary may be adapted according to the language of the buyer, of the seller, or of both. The same applies also to the rule regarding forbidden or banned combination of characters. Preferably, the determinant language or languages is the one(s) of the buyer.

The geographic location determination could be made by any suitable means.

The method to carry out an electronic payment may need no subscription or pre-subscription from the buyer, and needs no credit card. However, the seller has to subscript once to the intermediate, so that the intermediate has information or data about the seller. These data may for example be the name and address of the seller or seller's shop, the type of payment mode offered, and for e-commerce embodiments the domain name, the address or URL of the web site.

The information or data about the seller may be collected in a database, preferably stored on a server of the intermediate.

The steps of the method are carried out using any suitable program codes and any suitable program means on any suitable computer means.

The system for carrying out an electronic payment a comprises a telecommunication network allowing the transmission of SMS messages, a communication device allowing to send and receive SMS messages over a telecommunication network, program means to allocate to the seller a SMS number and/or SMS message, for a determined and limited time period, program means to disable a new allocation of the already allocated SMS number and a SMS message, means to transmit the SMS number and/or SMS message to the buyer, means to receive from a communication device the allocated SMS message to the SMS number allocated, program means to associate the seller to the SMS number allocated and the SMS message received, program means to release the allocated SMS number and/or SMS message for a new allocation for a new transaction and computer means to execute the program means.

The system further comprises means to generate SMS messages comprising alphanumeric characters, SMS messages comprising a sequence of numbers or letters or both. Preferably, the means to generate SMS messages are suitable to generate SMS messages having between 1 to 160 characters, preferably between 1 to 8, more preferably no more then 8, and even more preferably no more than 6 characters.

The system further comprises means to rank, or give a mark to, the SMS messages according to at least one rule defining the SMS messages as being user friendly.

In a preferred embodiment, the means to rank, or give a mark to, the SMS messages take into account the number of character present in the message, if the message is a word, an abbreviation or an acronym present in at least a conventional dictionary, a multi-field dictionary or a technical dictionary, and/or a letter being a phonetic equivalent of a word present in a dictionary, and/or a common abbreviation used in text messaging, the alternation of consonant and vowel, the physical distance, i.e. The number of keys between two keys to press on the telephone keypad to enter two adjacent characters in the message, the redundancy of the characters used and combinations of characters which are forbidden.

The system further comprises means to determine the geographic localisation of the buyer, or of the seller, or of both.

In a preferred embodiment, the means to allocate to the seller a SMS number and/or SMS message take into account the geographic location of the buyer, or of the seller, or of both, and allocate, according to said geographic location, a telephone number and a SMS message.

Preferably, the means to rank, or give a mark to, the SMS messages take into account the country and the language or languages of the buyer, or of the seller, or of both, and in particular to apply the rule to determine whether the SMS message is a word present in at least a conventional dictionary and to ban forbidden combinations of characters.

The system further comprises means to collect information about the seller.

The system further comprises storage means to store information or data from the buyer, or from the seller, or from both, and to store the SMS number and/or SMS messages. Preferably, the system comprises database means.

The system may further comprise means enabling real-time control of the SMS numbers and messages allocation and means to perform statistics on the allocation.

In order to protect the system against malicious multiple requests of allocation coming from a unique buyer, the system may further comprise means to limit the number of allocations possible for a unique buyer to a predetermined value.

The method and the system are suitable to receive a plurality of access requests associated with a plurality of buyers purchasing goods from a plurality of sellers.

The good to be purchased using the method and the system is any suitable good; preferably the goods are immaterial goods.

The method and the system are suitable for real-life transactions or for on-line transactions, real-life transactions being transactions between a buyer going into a shop of a seller for purchasing a good, and on-line transactions being transactions over the internet between a buyer using a computer connected to a public network, as the internet, to purchase goods offered in a seller web site.

The method and the system are suitable for carrying out a micropayment for goods sold over the internet.

An example of the method and system to carry out a micropayment will be now described.

A seller offers immaterial goods on his web site hosted in a computer, or server, connected to internet. The seller subscripts or subscribes once to the intermediate to identify himself. Preferably, the seller identifies himself by his name and address, his domain name, the address or URL of the web site, and identifies a protected content to purchase, or a protected web page, to which the buyer is redirected if the payment is done, and to another content, or a web page, if the payment is not valid. The data about the seller are collected in a database stored on a server of the intermediate.

A buyer using a computer connected to internet visits the seller's web site and wants to purchase a good. After he has made his choice, a program code, or script, present in the web site and provided by the intermediate, collects information about the web site and the buyer, in particular the geographic localisation of the buyer, and sends over internet this information to the intermediate server. Following this request, the intermediate server checks if a SMS number and message allocation is already in progress for this transaction. The allocation programme searches in the database for a free SMS number and SMS message. If no SMS number is available, an error message is sent to the web site of the seller which displays to the buyer a message indicating to try the purchase later. If a SMS number is available, the intermediate server allocates the SMS number in accordance with the geographic localisation of the buyer. The server allocates also a SMS message being user friendly and communicates the SMS number and SMS message to the website of the seller.

A script hosted by the server of the seller displays the SMS number and SMS message on a dedicated payment web page, or block, asking the buyer to send a SMS in order to make the payment. This allocation is available for 5 minutes.

When the buyer sends the SMS message, the telecommunication operator redirects the message to the intermediate server. The intermediate server blocks the SMS number and SMS message which could not be reattributed until the purchase is complete or until a predetermined time period has expired. The intermediate server, which has established a relationship between the SMS number and SMS message allocation and the seller, establishes also a relationship between the SMS message received and the seller, and establishes thus a relationship between the buyer and the seller.

A confirmation SMS is then sent to the buyer by the intermediate server to confirm the purchase and the buyer is redirected to the protected content of the seller's web site. The SMS number and SMS message which were allocated are then released for a new allocation.

If the buyer does not send the SMS message to the SMS number displayed, a routine program runs to release the unused SMS numbers and messages.

The SMS number and message allocation is available for 5 minutes and after this time period the intermediate server checks if a SMS message has been received. If not, the allocation is enabled for another period of 5 minutes, with a maximum of four extension of time period to a total of 20 minutes. After 20 minutes, the SMS number is released for another transaction.

The SMS numbers to allocate are premium number reserved by a telecommunication operator to the intermediate for providing the system and implementing the method. The billing of the access by the buyer to the protected content of the seller's web site is made by the telecommunication operator on the telephone or mobile bill of the buyer. The telecommunication operator pays the intermediate for providing the system and implementing the method, and the intermediate pays the seller a fixed amount for the access to his protected content.

As the intermediate has established and recorded a relation between the seller and the buyer, and can discriminate achieved transactions from non-achieved transactions, the method and system enables providing enhanced satisfaction of all the protagonists.

In an alternative embodiment of the method and system to carry out a micropayment, the determination of geographic localisation of the buyer can be performed by the buyer himself by choosing the relevant country on the web page of the seller web site.

Figure 4:
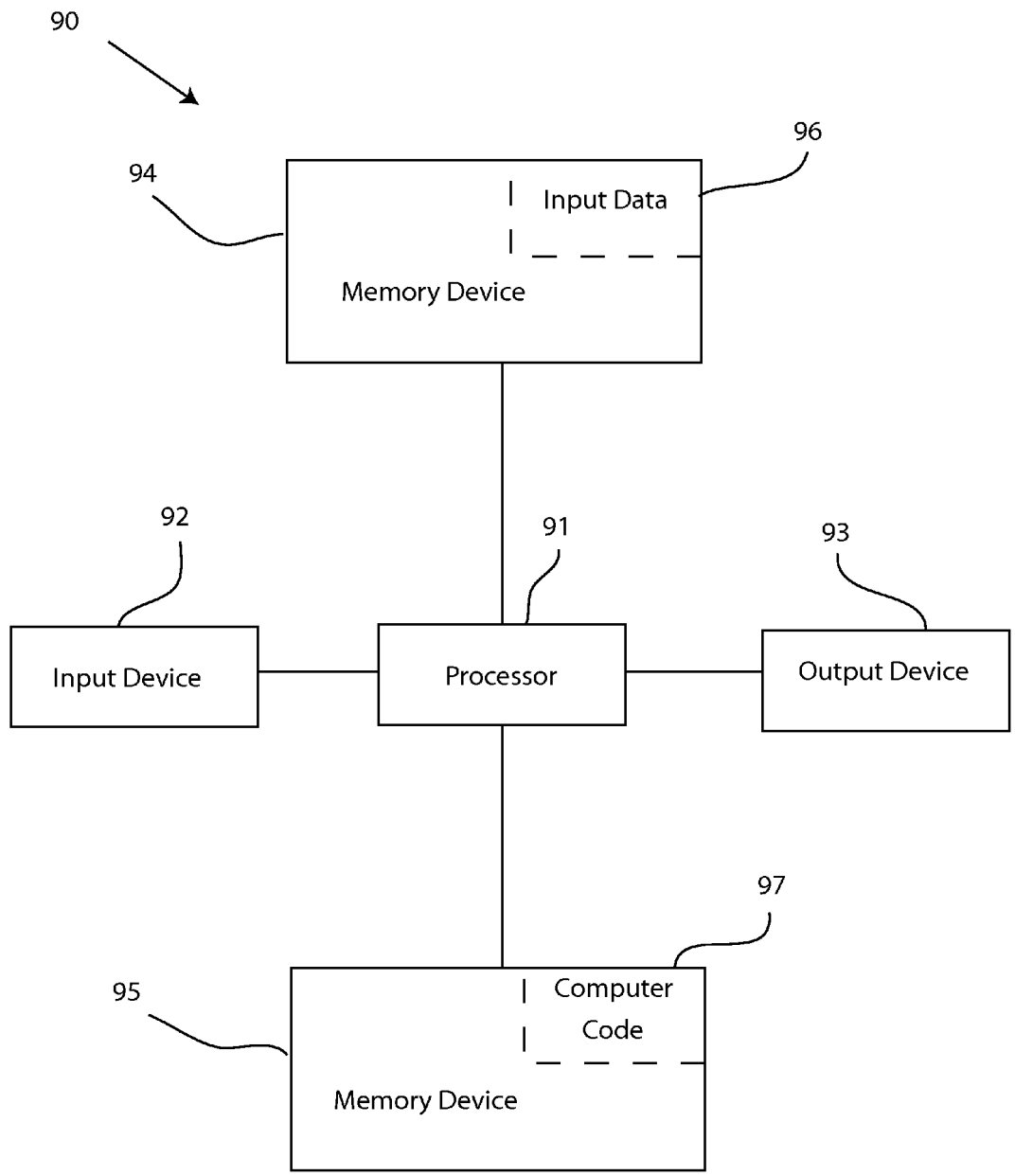
FIG. 4 depicts an embodiment of a computer apparatus used with a computer-implemented electronic payment method.

Referring now to FIG. 4, an embodiment of a computer apparatus 90 (e.g., computing system 10 of FIG. 1) used for electronic payment, is now described. The computer apparatus 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms or steps (e.g., the algorithms and/or steps of FIGS. 1-3) for an electronic payment method 100. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms and/or steps of FIGS. 1-3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer apparatus 90 may comprise the computer usable medium (or said program storage device). While FIG. 4 shows the computer apparatus 90 as a particular configuration of hardware and software, any configuration of hardware and software, as would be known to a person of ordinary skill in the art, may be utilized for the purposes stated supra in conjunction with the particular computer apparatus 90. For example, the memory devices 94 and 95 may be portions of a single memory device rather than separate memory devices.

Therefore, computing system 10 and/or software application 18 can enable a computer-implemented electronic payment method and/system 100.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims The claims provide the scope of the coverage of the invention and should not be limited to the specific examples provided herein.

What is claimed is:

1. A method to carry out an electronic payment between a seller and a buyer to purchase a good, said method comprising:
   receiving, by a computing system, a request from said seller;
   allocating, by the computing system, to said seller, for a determined and limited time period, a predefined short message service (SMS) number and a predefined SMS message;
   disabling, by the computing system, during said limited time period the allocation of said allocated predefined SMS number and said allocated predefined SMS message;
   communicating, by the computing system, to said buyer said allocated predefined SMS number and said allocated predefined SMS message;
   receiving, by the computing system, the allocated predefined SMS message from said buyer through a telecommunication network;
   associating, by the computing system, said buyer with said seller by associating the allocated predefined SMS message received from said buyer with said allocated predefined SMS number;
   enabling, by the computing system, said buyer to access said good based on the association between the allocated predefined SMS message and said allocated predefined SMS number; and
   enabling, by the computing system, said allocated predefined SMS number and said allocated predefined SMS message for a new allocation to a new transaction.

2. The method according to claim 1, further comprising: determining a geographic localisation of the buyer.

3. The method according to claim 2, wherein the allocating the predefined SMS number takes into account the geographic localisation of the buyer.

4. The method according to claim 1, further comprising: checking that said predefined SMS number and said predefined SMS message are not already allocated for a current transaction between the buyer and the seller.

5. The method according to claim 1, wherein the determined and limited time period ends when the buyer has accessed the good or a 20 minutes period after allocation has expired.

6. The method according to claim 1, further comprising: limiting a number of allocations possible for a unique buyer.

7. The method according to claim 1, further comprising: informing at least one of the buyer and the seller that said buyer has sent the allocated predefined SMS message to the allocated predefined SMS number.

8. The method according to claim 1, further comprising: billing the purchase of the good on at least one of a buyer telephone and a mobile bill.

9. A method of an electronic payment between a seller and a buyer to purchase a good, said method comprising:
- receiving, by a computing system, a request from said seller;
- allocating, by the computing system, to said seller, for a determined and limited time period, a predefined short message service (SMS) number and a predefined SMS message, wherein at least one of said predefined SMS number and said predefined SMS message is user friendly;
- disabling, by the computing system, during said limited time period the allocation of said allocated predefined SMS number and said allocated predefined SMS message;
- communicating, by the computing system, to said buyer said allocated predefined SMS number and said allocated predefined SMS message;
- receiving, by the computing system, the allocated predefined SMS message from said buyer through a telecommunication network;
- associating, by the computing system, said buyer with said seller by associating the allocated predefined SMS message received from said buyer with said allocated predefined SMS number;
- enabling, by the computing system, said buyer to access said good based on the association between the allocated predefined SMS message and said allocated predefined SMS number; and
- enabling, by the computing system, said allocated predefined SMS number and said allocated predefined SMS message for a new allocation to a new transaction.

10. The method according to claim 9, wherein the SMS message comprises 1 to 8 alphanumeric characters, further wherein user-friendly includes characteristics such as a length of the SMS message, message being present in a dictionary, an alternation of a consonant and a vowel, a physical distance on a communication device allowing to send SMS messages, a redundancy of the characters in said SMS message, and the characters forming said message form a forbidden message.

11. The method according to claim 9, further comprising:
- determining a geographic localisation of the buyer.

12. The method according to claim 11, wherein allocating the predefined SMS number takes into account the geographic localisation of the buyer.

13. The method according to claim 9, further comprising:
- checking that the predefined SMS number and the predefined SMS message are not already allocated for a current transaction between the buyer and the seller.

14. The method according to claim 9, wherein the determined and limited time period ends when the buyer has accessed the good or when a 20 minutes period after allocation has expired.

15. The method according to claim 9, further comprising:
- limiting a number of allocations possible for a unique buyer.

16. The method according to claim 9, further comprising:
- informing at least one of the buyer and the seller that said buyer has sent the predefined allocated SMS message to the predefined allocated SMS number.

17. The method according to claim 9, further comprising:
- billing the purchase of the good on at least one of a buyer telephone a mobile bill.

18. A system to carry out an electronic payment between a seller and a buyer, said system comprising:
- a processor; a non-transitory memory unit coupled to the processor, the memory unit storing instructions which when executed by the processor cause the processor to execute the steps of:
  - allocating to said seller a predefined SMS number and a predefined SMS message, for a determined and limited time period;
  - disabling during said limited time period a new allocation of the allocated predefined SMS number and the allocated predefined SMS message;
  - transmitting said allocated predefined SMS number and said allocated predefined SMS message to said buyer;
  - receiving from said buyer the allocated predefined SMS message at the allocated sent to the predefined SMS number;
  - associating said buyer with said seller by associating the allocated predefined SMS message received from said buyer with said allocated predefined SMS number;
  - enabling said buyer to access said good based on the association between the allocated predefined SMS message and said allocated predefined SMS number; and
  - enabling said allocated predefined SMS number and said allocated predefined SMS message for a new transaction after the determined and limited time period has expired.

19. The system according to claim 18, further comprising generating the plurality of SMS messages comprising between 1 to 8 alphanumeric characters, said plurality of SMS messages being user-friendly.

20. The system according to claim 18, wherein the generating the plurality of SMS messages take into account: the length of the SMS messages, the fact that said SMS messages are present in a dictionary, the alternation of consonant and vowel, the physical distance on a communication device allowing to send the SMS messages, the redundancy of the characters in said SMS messages, the fact that the characters forming said SMS message form a forbidden message.

21. The system according to claim 18, further comprising determining a geographic localisation of the buyer.

22. The system according to claim 21, wherein the allocating a SMS number and the SMS message to said seller takes into account the geographic location of the buyer.

23. The system according to claim 18, wherein the enabling the allocated predefined SMS number and allocated predefined SMS message enables said allocated predefined SMS number and said allocated predefined SMS message after the buyer has accessed the good or after a 20 minutes period after allocation has expired.

24. The system according to claim 20, further comprising limiting a number of allocations possible for a unique buyer.

25. The system according to claim 18, further comprising storing information or data from at least one of the buyer and the seller to store the plurality of SMS messages.

26. A system to carry out an electronic payment over a public network between a seller and a buyer, said system comprising:
- a processor; a non-transitory memory unit coupled to the processor, the memory unit storing instructions which when executed by the processor cause the processor to execute the steps of: allocating to said seller a predefined SMS number and a predefined SMS message for a determined and limited time period;
- disabling during said limited time period a new allocation of the allocated predefined SMS number and the allocated predefined SMS message;

transmitting said allocated predefined SMS number and said allocated predefined SMS message to said buyer;
receiving from said buyer the allocated predefined SMS message at the allocated predefined SMS number;
associating said buyer with said seller by associating the allocated predefined SMS message received from said buyer with said allocated predefined SMS number;
enabling said buyer to access said good based on the association between the allocated predefined SMS message and said allocated predefined SMS number; and
enabling said allocated predefined SMS number and said allocated predefined SMS message for a new transaction after the buyer has accessed the good or after a 20 minutes period after allocation has expired.

27. The system according to claim 26, further comprises generating the plurality of SMS messages comprising between 1 to 8 alphanumeric characters, said plurality of SMS messages being user-friendly.

28. The system according to claim 26, wherein generating the plurality of SMS messages takes into account the length of the SMS messages, the fact that said SMS messages are present in a dictionary the alternation of consonant and vowel, the physical distance on a communication device allowing to send SMS messages, the redundancy of the characters in said SMS messages, the fact that the characters forming said SMS messages form a forbidden message.

29. The system according to claim 26, further comprises determining a geographic localisation of the buyer.

30. The system according to claim 29, wherein the allocating a SMS number and the SMS message to said seller takes into account a geographic location of the buyer.

31. The system according to claim 26, further comprises limiting the number of allocations possible for a unique buyer.

32. The system according to claim 26, further comprises for storing information or data from at least one of the buyer and the seller to store the plurality of SMS messages.

33. A non-transitory computer readable storage medium storing instructions which when executed by a processor cause the processor to perform the steps of:
generating a plurality of short message service (SMS) messages, the plurality of SMS messages being user friendly;
allocating to said seller, for a determined and limited time period, a predefined SMS number and a predefined SMS message;
disabling during said limited time period said allocated predefined SMS number and said allocated predefined SMS message for a new allocation;
communicating to said buyer said allocated predefined SMS number and said allocated predefined SMS message;
receiving the allocated predefined SMS message from said buyer through a telecommunication network;
associating said buyer with said seller by associating the allocated predefined SMS message received from said buyer with said allocated predefined SMS number; and
enabling said allocated predefined SMS number and allocated predefined SMS message for a new transaction based on the association between the allocated predefined SMS message and said allocated predefined SMS number.

34. The non-transitory computer readable storage medium according to claim 33, further comprises: wherein the generating the plurality of SMS messages generates a message comprising 1 to 8 alphanumeric characters and takes into account the length of the message, the fact that said message is present in a dictionary, the alternation of consonants and vowels, the physical distance on a communication device allowing to send the plurality of SMS messages, the redundancy of the characters in said SMS messages, the fact that the characters forming said message form a forbidden message.

35. The non-transitory computer readable storage medium according to claim 33, further comprising: receiving information about said seller and for determining a geographic localisation of said buyer.

36. The non-transitory computer readable storage medium according to claim 35, wherein allocating the predefined SMS number and the predefined SMS message takes into account the geographic localisation of the buyer.

37. The non-transitory computer readable storage medium according to claim 33, further comprising checking that the predefined SMS number and the predefined SMS message are not already allocated for a current transaction between the buyer and the seller.

38. The non-transitory computer readable storage medium according to claim 33, wherein enabling said allocated predefined SMS number and said allocated predefined SMS message enables said allocated predefined SMS number and said allocated predefined SMS message after the buyer has accessed the good or after a 20 minutes period after allocation has expired.

39. The non-transitory computer readable storage medium according to claim 33, further comprising limiting a number of allocations possible for a unique buyer.

40. The non-transitory computer readable storage medium according to claim 33, further comprising communicating said allocated predefined SMS number and said allocated predefined SMS message to the buyer.

* * * * *